United States Patent [19]

Buriks et al.

[11] 4,032,514

[45] June 28, 1977

[54] OXYALKYLATED CYCLIC PHENOL-ALDEHYDE RESINS AND USES THEREFOR

[75] Inventors: Rudolf S. Buriks; Allen R. Fauke; Franklin E. Mange, all of St. Louis, Mo.

[73] Assignee: Petrolite Corporation, St. Louis, Mo.

[22] Filed: May 13, 1976

[21] Appl. No.: 686,094

Related U.S. Application Data

[63] Continuation-in-part of Ser. No. 172,917, Aug. 18, 1971, abandoned.

[52] U.S. Cl. .................. 260/51 EP; 252/331; 252/341; 252/342; 252/343; 252/344; 260/52; 260/53 EP; 260/51.5; 260/53 R; 260/57 R; 260/59 EP; 260/59 R
[51] Int. Cl.² .................. C08G 8/12; C08G 8/28
[58] Field of Search ........ 260/53 EP, 53 R, 59 EP, 260/51.5, 52, 51 EP, 59 R

[56] References Cited

UNITED STATES PATENTS

| 2,499,365 | 3/1950 | De Groote et al. ............... 252/338 |
| 2,499,370 | 3/1950 | De Groote et al. ............. 260/51 X |
| 3,169,118 | 2/1965 | Kirkpatrick et al. ............ 260/53 X |
| 3,206,412 | 9/1965 | Kirkpatrick et al. ............ 260/59 X |
| 3,320,208 | 5/1967 | Mange ................................ 260/47 |

*Primary Examiner*—Howard E. Schain
*Attorney, Agent, or Firm*—Sidney B. Ring; Hyman F. Glass

[57] ABSTRACT

Oxyalkylated cyclic phenol-aldehyde resins for example oxyalkylated cyclic tetramers; processes by which they are prepared; and method of using said oxyalkylated resins for a wide variety of uses, particularly as demulsifiers for water-in-oil type emulsions. Although oxyalkylated products are preferred, analogous products can also be prepared from alkylene sulfides, alkylene imines, or mixtures of more than one of these alkylene oxides, sulfides, or imines.

6 Claims, No Drawings

OXYALKYLATED CYCLIC PHENOL-ALDEHYDE RESINS AND USES THEREFOR

This Application is a Continuation-in-Part of Application Ser. No. 172,917, filed Aug. 18, 1971, now abandoned, By Rudolf S. Buriks, Allen R. Fauke and Franklin E. Mange.

Although linear phenol-aldehyde resins are well known, for example, as disclosed in U.S. Pat. No. 2,499,365; where cyclic phenol-aldehyde resins have been prepared they were produced in low yields in the nature of by-products of linear resins.

Application Ser. No. 172,869 filed Aug. 18, 1971 (D-71-19) describes and claims cyclic phenol-aldehyde resins which can be prepared in yields in excess of 90%.

Linear phenol-aldehyde resins may be depicted by the formula $\phi-(A°\phi)_n-A°\phi$ where $\phi$ is represented by the structure

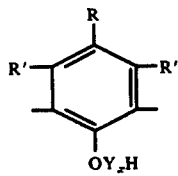

where A° is

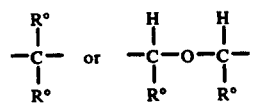

and A°s are the same or different, R is alkyl, alkenyl, aryl, cycloalkyl, heterocyclic, alkaryl, aralkyl, halo, alkoxy or phenoxy and the Rs are the same or different, R' is hydrogen, alkyl, alkenyl, aryl, cycloalkyl, heterocyclic, alkaryl, aralkyl, halo, alkoxy or phenoxy and the R's are the same or different, Y is AO, AS, AI or combinations or mixtures thereof, $x$ is 1 to about 2000, AO being akylene oxide, arylene oxide, alkarylene oxide, cycloalkene oxide, or combinations or mixtures thereof, AS being alkylene sulfide, AI being alkyleneimine, I being NR'' is hydrogen, alkyl, cycloalkyl, aryl, aralkyl or alkaryl and R° is hydrogen, alkyl, aryl, cycloalkyl, alkaryl, aralkyl or heterocyclic and the R°s are the same or different. In the cyclic phenol-aldehyde resin, the end valences are joined to form a cyclic structure, for example

where the circular line indicates a cyclic structure where n is, for example, 4–16 or greater. The preferred structure is the cyclic tetramer where $n = 4$

These cyclic resins are in general infusible and relatively solvent insoluble. By the term "relatively solvent in soluble", we mean that these materials show considerably less solubility in common organic solvents than the corresponding linear counterparts. The cyclic resins derived from a substituted phenol and an aldehyde are, for example, insoluble, or slightly soluble, in paraffinic hydrocarbons, ketones, esters, alcohols, water, dimethylformamide, etc. They show greater solubility in aromatic solvents and certain halogenated solvents, e.g., chloroform, and fair to good solubility in certain basic nitrogen solvents, i.e., pyridine, piperazine, etc. These solubility characteristics may be affected by changes in the bridge between the phenolic nuclei and/or by the substitution on the phenolic nucleus. Thus, for example, a long chain substitution will make the cyclic resins more hydrocarbon soluble than the corresponding short chain substituted material.

The peculiar effect of structure on melting point can be clearly appreciated by the following table which lists the melting points for the crystalline form of the compounds I:

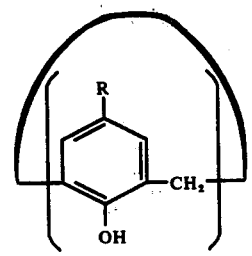

R = tert.-butyl

| n | m.p. |
|---|---|
| 0 | 160° C |
| 1 | 217 |
| 2 | 206 |
| 3 | 200 |
| 4 | 250 |
| 5 | 247 |
| 6 | 255 |

In comparison the cyclic tetramer of general structure II:

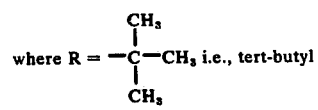

where R = $-\overset{CH_3}{\underset{CH_3}{C}}-CH_3$ i.e., tert-butyl has a melting point above 360° C, the limit of the melting point apparatus.

In general, we classify those resins melting above 300° C. as being infusible. These compounds generally decompose before melting.

The terms "relatively insoluble" and "infusible" as applied herein differentiate beween the cyclic resins and their linear counterparts. Structurally the cyclic resin has one bridging group for each phenolic unit, whereas the linear analogues have one less bridging group than phenolic units and the cross-linked phenol-formaldehyde resins have more than one bridging group per phenolic unit.

Other examples of high melting infusible resins of structure II are those with the following groups:

R = t-octyl: MP above 300° C dec.
R = phenyl: MP above 360° C dec.
R = cyclohexyl: MP above 360° C dec.
R = benzyl: MP above 360° C dec.
R = T-amyl: MP above 360° C dec.
R = t-hexyl: MP above 360° C dec.

The nature of the products formed from a phenolic compound and a carbonyl compound varies greatly depending on the method and conditions of reaction. Thus, if a phenol of type:

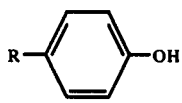

is reacted with an aldehyde, for example paraformaldehyde, under acidic conditions, the linear resin is formed almost exclusively. Under neutral conditions little or no reaction takes place. Under strongly basic conditions some cyclic tetramer is formed, but the formation of a linear product is strongly favored. Under midly basic conditions substantial amounts of the cyclic tetramer can be found in the resinous products. SN describes and claims a process of preparing cyclic resins in high yields, in certain instances approaching quantitative yields; thus, said process results in the almost exclusive formation of these infusible, relatively solvent insoluble cyclic tetramers in near quantitative yields by a simple one-step procedure.

In order to achieve higher yields of the cyclic tetramer, in addition to having mild basicity, it is desirable not only to carry out the condensation in a relatively non-polar solvent, but also to carry out the reaction at a slower rate than employed in forming the linear resin. Even by using proper basicity, a low yield of cyclic compound may result under the wrong conditions. Thus, by employing 37% aqueous formladehyde, a poor yield of the desired cyclic tetramer is obtained, whereas a high yield is obtained by using paraformaldehyde in a non-polar solvent such as xylene.

Since reaction between an aldehyde and a p-alkyl-phenol takes place don the ortho position, ortho-phenolic-aldehyde preformed reaction products can be employed as partial or complete replacements for the aldehyde and/or the phenolic compound. Furthermore, functionally equivalent derivatives of the orthomethylol phenols may be used, i.e., the chloromethyl phenols, the acetoxy methyl phenols, etc.

By the use of preformed phenolic compounds of the formula:

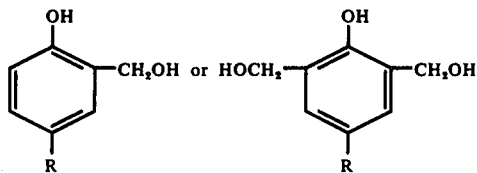

it is possible to form cyclic compounds with —CH$_2$— and/or —CH$_2$OCH$_2$— bridges depending upon the reaction conditions. When the methylol phenol compound is condensed under essentially neutral conditions using sufficiently high temperature to eliminate water, but not so high as to cause elimination of formaldehyde, a cyclic resin is obtained having 4–8 phenolic units (almost exclusively an even number of units rather than odd) bridged by ether-containing linkages —CH$_2$OCH$_2$—. However, since it is practically impossible to entirely exclude the elimination of formaldehyde some of the bridging will be by means of methylene groups —CH$_2$—.

When an ortho-dimethylol phenol compound is condensed under mildly basic conditions, cyclic resins are formed containing methylene bridges as described above. Formaldehyde is eliminated during this reaction. In addition, if the monomethylol phenol compound is used, the same cyclic resin is formed; however, in much lower yield.

Cyclic resins may be formed containing different phenolic units by a number of different procedures. Thus a mixture of, for example, para-tertiary amyl-phenol and para-tertiary butyl-phenol may be condensed with formaldehyde to give cyclic resins containing a mixture of phenolic units in each tetramer. By the use of this procedure it is best to use phenols having in general the same reactivity towards formaldehyde. When phenols of different reactivity are used, it is best to use different procedures involving the use of preformed phenol-aldehyde condensates as described above.

There should be present in the reaction mixture, at least 1.0 moles of carbonyl compound (combined or uncombined) per mole phenol having two active positions. The carbonyl-phenolic reaction can take place in situ or may be performed prior to reaction. If the required moles of carbonyl compound are present in the preformed compound, no further carbonyl compound need be added.

Since the carbonyl compound reacts with hydrogens on free positions of the phenolic ring, water is produced during the course of the reaction, using formaldehyde and a para-substituted phenol according to the general formula:

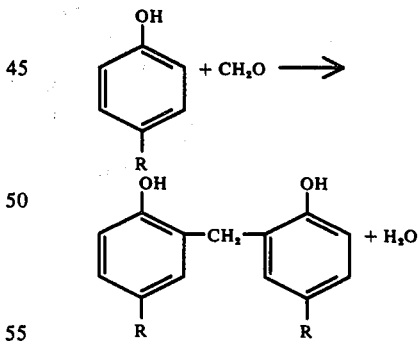

Thus water removal is necessary to complete the reaction and the amount of water removed indicates reaction completion. By removing water the equilibrium is shifted in favor of further condensation. The solvent employed can also be used as an azeotroping agent to aid in this water removal.

The following illustrates a general procedure for preparing the cyclic resins of this invention.

GENERAL PROCEDURE

In a resin pot, equipped with stirrer, thermometer and Dean-Stark trap with reflux condenser are placed in the p-alkyl phenol, paraformaldehyde and solvent. (The solvent amounts approximately to 60% of the total reaction mixture.) The mixture is heated to 50° C with stirring, which is continued throughout the reaction.

Then a catalytic amount of 50% aqueous sodium hydroxide (1.0 to 3.0 mole % based on the phenol) is added and the mixture slowly heated to 90° C, where it is held for 30 minutes, after which period it is usually clear and completely homogeneous. The mixture is then heated to reflux and kept at reflux for 4 hours, at which time all the water (and excess formaldehyde) has distilled. After cooling, the product is analyzed. Quite often this can be done by first removing the crystalline cyclic tetramer, which usually is quite insoluble, by suction filtration, followed by removal of the solvent from the filtrate in vacuo on a steam bath, to leave the linear condensation resin behind.

Many series of reactions were run according to the above procedure. All data so obtained strongly indicate that during the initial stages of the reaction, when the mixture is heated to 90° C before the water removal, mono- and dimethylol derivatives of the alkylphenol are formed in situ as reaction intermediates. These intermediates then during the subsequent reaction course condense with the elimination of water (and formaldehyde) to yield to desired product.

Said application SN states that an important variable determining the yield of cyclic tetramer in this reaction is the molar ratio of phenol to formaldehyde in the starting mixture. The following table demonstrates this discovery on a series of examples carried out with para-tertiary-butyl phenol and formaldehyde according to the general procedure.

TABLE I

| Ex. | Moles of p-t-butyl phenol | Moles of CH$_2$ | Moles of NaOH | ml of xylene | Yield of tetramer |
|---|---|---|---|---|---|
| 1 | 0.1000 | 0.100 | 0.002 | 50 | 45.4% |
| 2 | 0.1000 | 0.120 | 0.002 | 50 | 55.9% |
| 3 | 0.1000 | 0.150 | 0.002 | 50 | 74.8% |
| 4 | 0.1000 | 0.200 | 0.002 | 50 | 92.9% |

The percentage of yeild of cyclic tetramer (based on the amount of phenol used) clearly indicates the direct dependence of yield on the amount of formaldehyde used, with a quantitative yield approached at the 1:2 molar phenol/formaldehyde ratio.

Mono-methylol and dimethylol derivatives of p-tert.-butyl phenol were prepared and subsequently dissolved in xylene and condensed, after addition of base, under conditions comparable to those used in the general procedure, i.e., starting with p-tert.-butyl phenol and formaldehyde. The following are exemplary.

EXAMPLE A

Preparation of 5-t-butyl-2-hydroxybenzyl alcohol

In a 1-liter Erlenmeyer flask 150 g (1.00 mole) of p-t-butylphenol, 56 g (1.4 formulas) of sodium hydroxide dissolved in 400 ml of water, and 120 ml (1.6 moles, 40 g CH$_2$O/100 ml solution) of formaldehyde solution were combined. The mixture was kept at 50° in a water bath for 5 days with occasional swirling. (After 10 minutes the mixture had become a nearly clear solution, but cloudiness began to increase after an additional 5 minutes.) The precipitated solid product was suction filtered, washed with a little water, and sucked as dry as possible. This still moist salt was neutralized by treatment with about 600 ml of 10% acetic acid. The new solid which formed was filtered and washed with water to give 107.9 g, m.p. 65°–85°. Two recrystallizations from hexane with a small amount of ether added yielded 90.1 g (50%) of 5-t-butyl-2-hydroxybenzyl alcohol m.p. of 91°–92°. The NMR spectrum of this compound (3.1 $\tau$, multiplet, 3 protons, aromatic; 6.1, broad singlet, 2, OH; 5.42, singlet, 2,CH$_2$; 8.80, singlet, 9, C(CH$_3$)$_3$) is interesting in that the two nonequivalent hydroxyls appear to give only one peak. This is probably caused by time averaging of the two hydroxy protons due to hydrogen bonding and the acidity of the phenolic proton.

EXAMPLE B

Preparation of 4-t-butyl-2,6-bis(hydroxymethyl) phenol

In a 1-liter Erlenmeyer flask were combined 75 g (0.50 mole) of p-t-butylphenol, 20 g (0.5 formula) of sodium hydroxide dissolved in 200 ml of water, and 94 ml (1.25 formulas CH$_2$O) of formalin solution (40 g CH$_2$O/100 ml). After sitting 6 days at room temperature, the solution had produced a heavy precipitate. This salt was suction filtered and washed with saturated aqueous sodium chloride solution. Addition of about 200 ml of saturated aqueous sodium chloride solution to the filtrate produced a second crop of solid, which also was suction filtered. Dissolving each of these crops of moist solid in about 400 ml of warm water, followed by neutralization with 10% aqueous acetic acid produced oils which crystallized on cooling. Suction filtration, washing with water, and drying gave 39 g, m.p. 70°–75°, from the first crop of salt and 46 g, m.p. 68°–73°, from the second crop (total crude yield 77%). Recrystallization of the first crop material from ether-hexane gave 7.5 g, m.p. 74°–76°; 21.3 g. m.p. 74°–76°; 7.6 g, m.p. 72°–74°; and 2.0 g, m.p. 70°–74° (some difficulty with oiling out). Recrystallization of the second crop material from carbon tetrachloride gave 21 g, m.p. 71°–74°, and another crop of 5.9 g, m.p. 70°–74°. Final yield 41.1 g (39%), m.p. 73°–75°.

In a second run exactly the same procedure was used, but all quantities were doubled. Again two crops of product salt were collected, which after neutralization gave 75 g, m.p. 74°–75°, and 89 g, m.p. 68°–73° (78% crude yield). Recrystallization (CCl$_4$) gave 115 g (55%), m.p. 74°–75°.

Condensation reactions of p-t-butyl phenol and its hydroxymethyl substituted derivatives The procedure used was the same as that used in Table I. The reactions were carried out in 50 ml of xylene using 0.002 moles of NaOH catalyst per 0.100 mole of mono- or dimethylol derivative.

TABLE II

| Ex. | Phenol | Yield of cyclic tetramer |
|---|---|---|
| 1 | 4-t-butyl-2,6-bis (hydroxy methyl) phenol | 85.2% |
| 2 | '' | 86.4% |
| 3 | 5-t-butyl-2-hydroxy benzyl alcohol | 55.1% |
| 4 | '' | 53.2% |

These data again show clearly that in those reactions where the (in this case precondensed) formaldehyde is present in a molar excess to the alkyl phenol the yield of desired tetramer is substantially higher than under conditions where this molar ratio is unity.

The above examples and general procedure illustrate the preferred conditions for the preparation of these cyclic tetrameric alkylphenol-formaldehye condensates. Considering the preparation either directly from the alkylphenols and aldehydes or from the preformed methylol phenols the following points are noted:

1. The temperature range is between about 80° C to 250° C with the preferred range being about 135° C–185° C;
2. The reaction time depends on the temperature and the catalyst, for example, as long as about 200 hours or longer or as short as about 2 hours or shorter.
3. The catalyst may be strong alkali or an alkali salt of a weak acid, such as sodium acetate and the mole % of catalyst can be as high as about 10%, or as low as 0.001%, preferably with NaOH in the range of 1.0 to 3.0 mole percent, based on the starting phenol.
4. Any non-reacting non-polar solvent can be used, for example hydrocarbon solvents such as benzene, xylene, trimethyl benzene, dodecyl benzene, high-boiling petroleum solvent, etc., with the preferred ones being xylene and trimethyl benzene.
5. It is desirable to provide sufficient stirring, for example with an anchor-type stirrer being preferred to a turbine-type stirrer.
6. The preferred molar ratio of aldehyde to phenol is 2.5:1 to 1:1 with a preferred ratio of 2:1.
7. Non-polar conditions are employed and it is desirable to avoid the use, as much as possible, of hydroxylic components. Thus the use of paraformaldehyde is preferred over aqueous (i.e., 37%) formaldehyde. A wide variety of other aldehydes can also be used.

The following table presents a wide variety of resins that can be prepared according to the procedure of this invention. The following compounds employed in preparing cyclic tetrameric alkylphenol-aldehyde resins are designated by the numbers indicated for each phenolic compound.

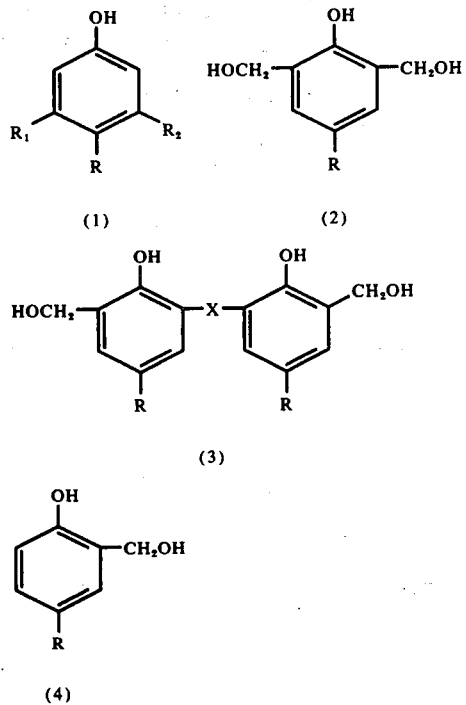

R, $R_1$, and $R_2$ in the Table indicate the specific substituents on these compounds. Where more than one phenolic compound is reacted, the molar ratio of the phenolic compounds inter se is indicated. For example, in Example 31 tert-butyl(2) and nonyl(1) means that a ratio of 2 moles of tert-butyl phenol per mole of nonyl phenol is employed in preparing the resin.

TABLE III

| Ex. | Cpd. | R | $R_1$ | $R_2$ | Aldehyde |
|---|---|---|---|---|---|
| 1 | 1 | methyl | H | H | para formaldehyde |
| 2 | 1 | ethyl | H | H | " |
| 3 | 1 | isopropyl | H | H | " |
| 4 | 1 | sec.butyl | H | H | " |
| 5 | 1 | tert butyl | H | H | " |
| 6 | 1 | tert amyl | H | H | " |
| 7 | 1 | cyclohexyl | H | H | " |
| 8 | 1 | tert hexyl | H | H | " |
| 9 | 1 | octyl | H | H | " |
| 10 | 1 | tert octyl | H | H | " |
| 11 | 1 | nonyl | H | H | " |
| 12 | 1 | dodecyl | H | H | " |
| 13 | 1 | phenyl | H | H | " |
| 14 | 1 | benzyl | H | H | " |
| 15 | 1 | butenyl | H | H | " |
| 16 | 1 | styryl | H | H | " |
| 17 | 1 | chloro | H | H | " |
| 18 | 1 | methyl | methyl | H | " |
| 19 | 1 | methyl | ethyl | H | " |
| 20 | 1 | methyl | propyl | H | " |
| 21 | 1 | methyl | methyl | methyl | " |
| 22 | 1 | tert butyl | H | H | furfural |
| 23 | 1 | nonyl | H | H | " |
| 24 | 1 | tert octyl | H | H | " |
| 25 | 1 | octyl | H | H | acetaldehyde |
| 26 | 1 | tert butyl | H | H | benzaldehyde |
| 27 | 1 | phenyl | H | H | " |
| 28 | 1 | methyl | H | H | " |
| 29 | 1 | cyclohexyl | H | H | " |
| 30 | 1 | nonyl | H | H | " |
| 31 | 1 | tert butyl (2) | H | H | para formaldehyde |
|  | 1 | nonyl (1) | H | H |  |
| 32 | 1 | tert butyl (1) | H | H | " |
|  | 1 | tert octyl (1) | H | H |  |
| 33 | 1 | tert butyl (3) | H | H | " |
|  | 1 | tert octyl (1) | H | H |  |
| 34 | 1 | tert butyl (1) | H | H | " |
|  | 1 | tert amyl (1) | H | H |  |

TABLE III-continued

| Ex. | Cpd. | R | R₁ | R₂ | Aldehyde |
|---|---|---|---|---|---|
| 35 | 1 | benzyl (1) | H | H | ″ |
|  | 1 | cyclohexyl (1) | H | H |  |
| 36 | 2 | tert butyl | — | — | none |
| 37 | 1 | tert butyl (1) | H | H | none |
|  | 2 | tert butyl (1) | — | — |  |
| 38 | 2 | tert butyl (1) | — | — | none |
|  | 1 | nonyl (1) | H | H |  |
| 39 | 2 | methyl (1) | — | — | none |
|  | 1 | octyl (1) | H | H |  |
| 40 | 4 | tert butyl | — | — | none |
| 41 | 4 | tert butyl (1) | — | — | para formaldehyde |
|  | 1 | tert butyl (1) | H | H |  |
| 42 | 3 | isopropyl | X=CH₂—O—CH₂ | — | none |
| 43 | 3 | tert butyl | X=CH₂—O—CH₄ | — | ″ |
| 44 | 3 | methyl | X=CH₂ | — | ″ |
| 45 | 3 | tert butyl | X=C(CH₃)CH₃ | — | ″ |

To further illustrate reactions of the type listed in the above Table, the following examples describe similar preparations in more detail.

EXAMPLE 46

Reaction of

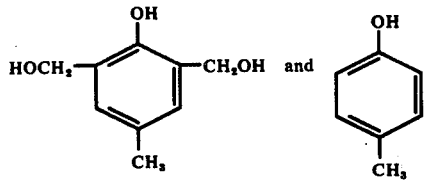

is carried out by reacting at reflux 16.8 grams (0.1 moles) 2,6-dimethylol-4-methylphenol, 10.8 grams (0.1 mole) paracresol, and 0.5 grams anhydrous sodium acetate in 175 ml. xylene. The water produced is continuously removed from the reaction zone by azeotropic distillation into a Dean Stark trap. The course of the reaction is followed by periodic testing for free methylol phenol with methanolic ferric chloride. After all the methylol phenol has been consumed (57 hours) the reaction mixture is cooled, the colorless precipitate collected on a filter, washed with 95% ethanol and air-dried to give 16.6 g (69.5% of theory). The colorless powder does not melt below 350° C, is soluble in pyridine, less so in chloroform or chlorobenzene and slightly soluble to insoluble in hydrocarbon solvents, alcohols, ketones, etc. Its infrared spectrum shows no free ortho positions, no methylol groups, and only methylene bridges between the phenolic nuclei.

EXAMPLE 47

Reaction between p-t-amyl phenol and para formaldehyde 200 grams (1.22 moles) of para-tertiary amylphenol are dissolved in 400 ml. xylene. To the solution 1 gram (0.025 moles) of NaOH and 48.2 grams (1.45 moles) of 91% paraformaldehyde are added. The mixture is heated slowly to reflux (110° C) at which temperature water begins to distill. After refluxing for 125 minutes the temperature reaches 150° C and solids begin to appear in the reaction mixture and the amount of solids increases as reflux continues. After 17 hours of reflux, the theoretical amount of water has been collected and no more methylol groups can be detected by the methanolic-FeCl₃ test. The mixture is then allowed to cool down slowly to room temperature overnight. The white microcrystalline solid product weighs 136.4 grams after filtration, isopropanol washing and drying. The yield is 63% of theory.

The product is insoluble in methanol, ethanol, isopropanol, mineral spirits and hexane, practically insoluble in benzene, xylene and acetone. It does not melt below 350° C. Its infrared spectrogram shows no methylol group, no benzyl ether bridge, and no adjacent free hydrogens on the aromatic ring.

EXAMPLE 48

Sodium hydroxide catalyzed reaction of 5t-butyl-2hydroxy benzyl alcohol

In a 100 ml round-bottom flask equipped with a magnetic stirrer and Dean-Stark trap with reflux condenser were placed 10.0 g (0.100 moles) of 5-t-butyl-2-hydroxy benzyl alcohol, 40 ml of toluene and 0.25 g (0.003 formula) of 50% aqueous sodium hydroxide. The mixture was heated at reflux for 24 hours, after which time 1.95 ml of water had been collected. After cooling, filtration gave 7.57 g (46.7%) of white, crystalline cyclic tetramer.

EXAMPLE 49

Reaction between p-t-butyl phenol and para formaldehyde

A reactor was charged with 24.5 lbs. of para-tert-butyl phenol, 6 lbs. of para formaldehyde and 57.25 lbs. of xylene. The above charge was heated to 50° C and 0.213 lbs. of 50% aqueous sodium hydroxide was added. The product was now heated to 90° C and held there for 0.5 hour, then heated to reflux. Reflux began at 135° C and gradually increased to 145° C under azeotropic conditions to remove 4.0 lbs. aqueous layer and 2.25 lbs. solvent. Total time at reflux was 4½ hours. After cooling to 60° C the product was dropped. Some solid stayed behind because it had caked out on the coils. Analysis of the material so obtained indicated 77–80% yield of the desired cyclic tetramer.

The foregoing examples have illustrated the production of suitable resins from difunctional phenols and aldehydes. Non-limiting examples include: p-cresol; p-ethyl-phenol; 3-methyl- 4-ethyl-phenol; 3-methyl-4-propyl-phenol; p-propyl-phenol; p-tertiary-butyl-phenol; p-secondary-butyl-phenol; p-tertiaryamyl-phenol; p-secondary-amyl-phenol; p-tertiary-hexylphenol; p-isoctyl-phenol; p-phenyl-phenol; thymol; p-benzyl-phenol; p-cyclohexyl-phenol; p-tertiary-decyl-phenol; p-dodecyl-phenol; p-tetradecyl-phenol; p-octadecyl-phenol; p-nonyl-phenol; p-heptyl-phenol; p-eicosanyl-phenol; p-docosanyl-phenol; p-tetracosanyl-phenol; p-beta-napthyl-phenol; p-alpha-naphthyl-phenol; p-pentadecyl-phenol; those of the formula

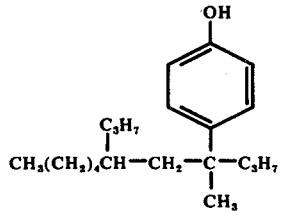

p-tertiary-alkyl-phenols of the formula

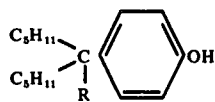

in which R is $C_9H_{19}$ to $C_{13}H_{27}$; p-cetyl-phenol; p-cumyl-phenol; phenols of the formula

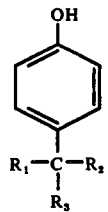

in which $R_1$ represents a straight chain hydrocarbon radical containing at least 7 carbon atoms and $R_2$ and $R_3$ represent hydrocarbon radicals the total number of carbon atoms attached to the tertiary carbon being at least 11; and phenols of the formula

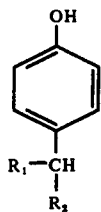

in which $R_1$ represents an alkyl hydrocarbon radical containing at least 7 carbon atoms in a straight chain and $R_2$ represents an alkyl hydrocarbon radical containing at least 2 carbon atoms, the total number of carbon atoms in $R_1$ and $R_2$ being at least 11; p-chlorophenol; p-dimethylaminomethyl-phenol; p-pentenyl-phenol; p-phenoxyphenol; p-hydroxybenzophenone; etc.

In summary, by employing the process of Ser. No. 172,869 one is capable of preparing cyclic phenol-aldehyde resins in high yields where the phenol is substituted at least in the para-position and unsubstituted in the ortho positions. Thus the phenol may be

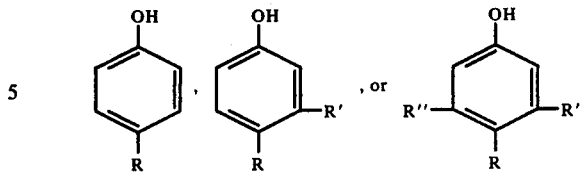

The R's may be any group that does not interfere with the reaction, such as alkyl, alkenyl, aryl, cycloalkyl, heterocyclic, alkaryl, aralkyl, halo, alkoxy, phenoxy, etc. The R's may be the same or different. The preferred species is a para-alkyl phenol. Although formaldehyde is preferred, any aldehyde that does not interfere with the reaction can be employed, for example, any aldehyde of the formula

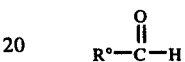

where R° is alkyl, aryl, cycloalkyl, alkaryl, aralkyl, heterocyclic, etc.

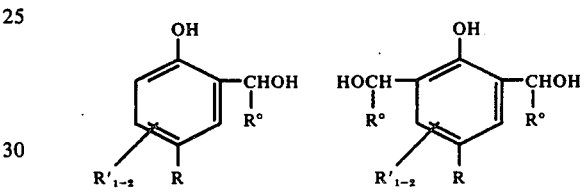

where R° is H or a substituted group.

The preformed methylol compound can be reacted alone and reacted in combination with additional phenol and aldehyde.

The reaction is carried out under any temperature capable of promoting the reaction, such as from 80° C to the decomposition temperature of the reactants or products, such as from 80°–250° C, for example, from 100°–200° C, but preferably from 135°–185° C. Although the time of the reaction is temperature and catalyst dependent, reaction times are in general longer than those employed to prepare the corresponding linear resins, for example, from about 1–200 hours, such as from about 2 to 72 hours, but preferably from about 2 to 6 hours.

Any suitable catalyst can be employed whether strong or weak bases, such as an alkali metal hydroxide, i.e., sodium, potassium, lithium, etc., or salts thereof. The catalyst is employed in any concentration capable of promoting the reaction, such as from trace to large amount, such as from 0.001 to 10 mole percent, such as from about 0.05 to 5%, for example, from about 0.1 to 4%, but preferably from about 1.5 to 2.5%, based on phenol with an optimum of about 2.

Any non-reacting, non-polar solvent can be employed, for example, hydrocarbon solvents such as aliphatic or aromatic solvents or mixtures thereof, but preferably aromatic solvent such as xylene and trimethyl benzene or corresponding commercial solvent containing these components.

By a non-polar solvent we mean an inert solvent, i.e., a solvent that will not react with reactants or products, having low dielectric constant, that is, below about 10 (at 20° C), preferably below about 3, especially between about 1.9 and 2.6, for example, the following solvents:

benzene 2.284
cyclohexane 2.023
toluene 2.391
o-xylene 2.568
m-xylene 2.374
p-xylene 2.270
ethylbenzene 2.412
n-octane 1.948
isooctane 1.940
mesitylene 2.279
cumene 2.380
n-nonane 1.972

Besides the use of a proper non-polar solvent, the reaction is carried out under non-polar conditions. It is desirable to avoid the presence of hydroxylic compounds such as water, alcohols, etc. Thus, paraformaldehyde is employed instead of aqueous (37%) formaldehyde.

The ratio of aldehyde to phenol should be at least stoichiometric, such as 1:1, but in practice it is desirable to employ an excess of aldehyde, such as a ratio of from 1.1:1 to 2.5:1 or higher, but preferably about 2:1.

The reaction should be carried out with adequate stirring sufficient to insure the desired reaction. An anchor type stirrer is preferred.

We have now discovered that the cyclic phenol-aldehyde resins described in said application Ser. No. 172,869 can be oxyalkylated to yield valuable compositions. In view of the fact that these cyclic resins are insoluble and infusible they are generally oxyalkylated as a suspension. Stated another way, despite their insolubility in the oxyalkylation reaction medium, we have found these resins can still be oxyalkylated to yield products which are soluble in the solvent.

These compositions derived from cyclic tetramers by oxyalkylation are surfactants and can be used in the treatment of emulsions of mineral oils and water, such as petroleum emulsions commonly encountered in the production, handling and refining of crude mineral oil. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines, dispersed in a more or less permanent state, throughout the oil, which constitutes the continuous phase of the emulsion.

The invention provides an economical and rapid process for breaking and separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e., desalting).

Demulsification, as contemplated in the present application, includes the preventive step of commingling the demulsifier with the hydrocarbon phase. Similarly such demulsifier may be mixed, emulsified, suspended, etc., in the aqueous component.

Heretofore, many oxyalkylated phenol-aldehyde resins have been employed in resolving W/O emulsions. However, all of these resins have been linear condensation polymers of substituted phenols and aldehyde and their oxyalkylation products.

We have now devised methods for preparing derivatives of cyclic tetramers by oxyalkylation of base catalyzed slurries or dispensions thereof to yield oxyalkylated derivatives. By selecting the type and amount and order of the alkylene oxides condensed onto these cyclic tetramers a new class of outstanding compositions of matter was prepared, which exhibits the desired solubility and surface active properties to make them particularly suitable for demulsification of crude oil emulsions. We have found that the oxyalkylated cyclic phenol-aldehyde resins of this invention, when compared by the standard bottle testing procedure for crude oil emulsions, with their known linear analogously oxyalkylated counterparts, show a much higher activity and effectiveness, or in other words, will accomplish the same oil treatment at a much lower concentration. In short, these novel cyclic compositions are far superior as demulsifiers to their linear counterparts of similar overall composition.

The following Table A lists some examples of such cyclic tetrameric crystalline, infusible, relatively solvent insoluble p-substituted-phenol-formaldehyde resins.

TABLE A

| Ex. | p-substituted-phenol | aldehyde | Products |
|---|---|---|---|
| 2C | -methyl | p-formaldehyde | All products are white crystalline, infusible (i.e., with melting points above 300° C with slow decomposition) materials with extremely low solubilities in hydrocarbon solvents. Solubilities are better for products derived from p-alkylphenols with longer alkyl tails than for those with short tails. |
| 3C | -t-butyl | " | |
| 4C | -t-amyl | " | |
| 5C | -t-hexyl | " | |
| 6C | -t-octyl | " | |
| 7C | -t-butyl (2) | " | |
| 8C | -nonyl (1) -t-butyl (1) -t-octyl (1) | " | |
| 9C | -t-butyl (3) -t-octyl (1) | " | |
| 10C | -nonyl (1) -t-amyl (1) | " | |
| 11C | -phenyl | " | |
| 12C | -benzyl | " | |

The general method for the preparation of oxyalkylated derivatives of cyclic phenol-formaldehyde tetramers is described in Example 13C.

EXAMPLE 13C

General procedure for the oxyalkylation of cyclic phenol-formaldehyde tetramers

Pure cyclic tetramer and 3 to 5% by weight of KOH, dissolved in an equal amount of water, are heated together with two to four times their weight of xylene, under azeotropic reflux, until catalyzation is complete and no more water can be removed. This usually takes from 3 to 6 hours depending upon the batch size. Since the tetramer is very poorly, if at all, soluble in the xylene, it is essential that efficient rapid stirring is applied to keep the very finely dispersed solid homogeneously distributed throughout the liquid. The mixture is then transferred to a pressure reactor or autoclave equipped with a means of external (electric) heating, internal cooling and efficient mechanical agitation. The resin is heated to 120°–140° C and the alkyleneoxide or mixture of oxides is charged into the reactor until the pressure is 25–75 p.s.i. During the ensuing oxylakylation reaction the original suspension gradually clears up and after all the oxide has been added and the reaction has been completed, which usually takes from 2 to 12 hours depending upon the nature of the reactants, the resulting product solution, the oxyalkylated derivative of the cyclic tetramer, now completely soluble in xylene, is cooled and ready to be applied for demulsifier use.

As mentioned before, the alkali catalyzed condensation of substituted phenols and aldehydes will, depending upon the reaction parameters, result in either formation of linear condensates or nearly quantitative yields of pure cyclic tetramer. To obtain samples of the linear condensates we prepared reaction products from substituted phenols and formaldehyde in equi-molar ratio using a higher concentration of basic catalyst, according to procedures well known to those skilled in the arts. Solutions of the linear resins were then filtered to remove any crystalline insoluble tetrameric by-products, present in minor amounts, and subsequently evaporated in vacuo to obtain samples of the resinous, low melting, readily xylene soluble polymeric linear substituted phenol-aldehyde condensates. These linear condensates we will identify by the same numbers as were used in Table A, in such a manner that 2L indicates the linear phenol formaldehyde resin prepared from para-cresol and para-formaldehyde, 3L the linear resin prepared from p-tert-butyl phenol and para-formaldehyde, etc.

These linear resins were also oxyalkylated with a variety of levels of alkylene oxides, to prepare materials to be used in direct comparison with their cyclic tetramer analogues for their effectiveness when applied for demulsifier use.

The following Table B presents illustrative examples of the products that were prepared by oxyalkylation of various cyclic tetrameric substituted phenol-formaldehyde resins from Table A.

TABLE B

| Example | Tetramer used | Weight of tetramer | Weight of oxide added to tetramer | | |
|---|---|---|---|---|---|
| | | | EtO | PrO | EtO |
| 14C | 3C | 1 | — | 0.60 | — |
| 15C | " | 1 | — | 0.60 | 0.20 |
| 16C | " | 1 | — | 0.60 | 0.40 |
| 17C | " | 1 | — | 0.20 | 0.15 |
| 18C | " | 1 | — | 0.20 | 0.40 |
| 19C | " | 1 | — | 0.20 | 0.60 |
| 20C | " | 1 | 0.24 | 0.36 | — |
| 21C | " | 1 | 0.30 | — | — |
| 22C | " | 1 | 0.50 | — | — |
| 23C | " | 1 | 0.70 | — | — |
| 24C | " | 1 | 0.16 | 0.24 | — |
| 25C | 4C | 1 | — | 0.60 | — |
| 26C | " | 1 | — | 0.60 | 0.20 |
| 27C | " | 1 | — | 0.60 | 0.40 |
| 28C | " | 1 | — | 0.20 | 0.15 |
| 29C | " | 1 | — | 0.20 | 0.40 |
| 30C | " | 1 | — | 0.20 | 0.60 |
| 31C | " | 1 | 0.24 | 0.36 | — |
| 32C | " | 1 | 0.30 | — | — |
| 33C | " | 1 | 0.50 | — | — |
| 34C | " | 1 | 0.70 | — | — |
| 35C | 6C | 1 | 0.20 | — | — |
| 36C | " | 1 | 0.30 | — | — |
| 37C | " | 1 | 0.39 | — | — |
| 38C | " | 1 | 0.50 | — | — |
| 39C | " | 1 | 0.60 | — | — |
| 40C | " | 1 | 0.79 | — | — |
| 41C | " | 1 | 1.0 | — | — |
| 42C | " | 1 | 1.2 | — | — |
| 43C | " | 1 | 0.20 | 0.13 | — |
| 44C | " | 1 | 0.21 | 0.27 | — |
| 45C | " | 1 | 0.20 | 0.40 | — |
| 46C | " | 1 | 0.30 | 0.53 | — |
| 47C | " | 1 | — | 0.27 | — |
| 48C | " | 1 | — | 0.27 | 0.20 |
| 49C | " | 1 | — | 0.27 | 0.39 |
| 50C | " | 1 | — | 0.54 | — |
| 51C | " | 1 | — | 0.54 | 0.20 |

TABLE B-continued

| Example | Tetramer used | Weight of tetramer | Weight of oxide added to tetramer | | |
|---|---|---|---|---|---|
| | | | EtO | PrO | EtO |
| 52C | " | 1 | — | 0.54 | 0.41 |
| 53C | " | 1 | — | 0.54 | 0.61 |
| 54C | " | 1 | — | 0.54 | 0.79 |
| 55C | 5C | 1 | 0.20 | — | — |
| 56C | " | 1 | 0.40 | — | — |
| 57C | " | 1 | 0.60 | — | — |
| 58C | " | 1 | 0.80 | — | — |
| 59C | " | 1 | 1.00 | — | — |
| 60C | " | 1 | 1.20 | — | — |
| 61C | " | 1 | 0.20 | 0.20 | — |
| 62C | " | 1 | 0.20 | 0.30 | — |
| 63C | " | 1 | 0.20 | 0.40 | — |
| 64C | " | 1 | 0.20 | 0.50 | — |
| 65C | " | 1 | — | 0.20 | — |
| 66C | " | 1 | — | 0.20 | 0.10 |
| 67C | " | 1 | — | 0.20 | 0.20 |
| 68C | " | 1 | — | 0.20 | 0.30 |
| 69C | " | 1 | — | 0.40 | — |
| 70C | " | 1 | — | 0.40 | 0.20 |
| 71C | " | 1 | — | 0.40 | 0.40 |
| 72C | " | 1 | — | 0.40 | 0.60 |
| 73C | " | 1 | — | 0.60 | — |
| 74C | " | 1 | — | 0.60 | 0.30 |
| 75C | " | 1 | — | 0.60 | 0.60 |
| 76C | " | 1 | — | 0.60 | 0.90 |

The examples presented in the above Table B are illustrative. It will be obvious to those skilled in the art that the table can be expanded and elaborated upon without limit by changing the nature and combinations of the substituted phenols and aldehydes used to prepare the starting cyclic tetramers and the nature, order and amounts of oxides used in the subsequent oxyalkylations of these tetramers.

Linear analogues of these materials, however, are well known and have been described in numerous publications and patents dealing with substituted phenol-formaldehyde resins and their uses and applications. Several of these linear analogues were also prepared by us and rather than describe these materials in a separate section, we will just identify them by the system introduced before using the letter L to indicate their linear nature. For example, 14L identifies the linear t-butyl phenol-formaldehyde resin oxyalkylated with 0.60 weights of PrO, 15L is the linear t-butyl phenol-formaldehyde resin oxyalkylated with 0.60 weights of PrO followed by 0.20 weights of EtO, etc.

A wide variety of oxyalkylated cyclic resins can be prepared according to this invention including oxyalkylation with one or more alkylene oxides including homo-oxyalkylates, block oxyalkylates, heteric-oxyalkylates (i.e., oxyalkylated with premixed alkylene oxide), etc. Thus, the cyclic phenol-aldehyde resin $Z(OH)_z$ where z is equal to the number of phenol-aldehyde ($\phi A$) units in the ring. In the case of the cyclic tetramer $z = 4$. Thus, generally the oxyalkylated product is

$$Z[(OA)_nOH]_z$$

where A is the radical derived from the alkylene oxide, n is a number determined by the moles of alkylene oxides, n is a number determined by the moles of alkylene oxides, for example from less than 1 to about 2,000 or more, such as from about 1–1000 or more, for example from about 1 to 500, but preferably a from about 1 to 350. Where the oxyalkylate is employed as a demulsifier, depending on the particular type and/or mixture of alkylene oxides employed, n can range from about 1 to 500, such as from about 1 to 350, but preferably from about 1 to 50. The value of $z$ will be determined by the number of phenolic OH in the cyclic resin. In the case of the tetramer $z = 4$. Thus, an oxyalkylated tetramer would have the following idealized formula:

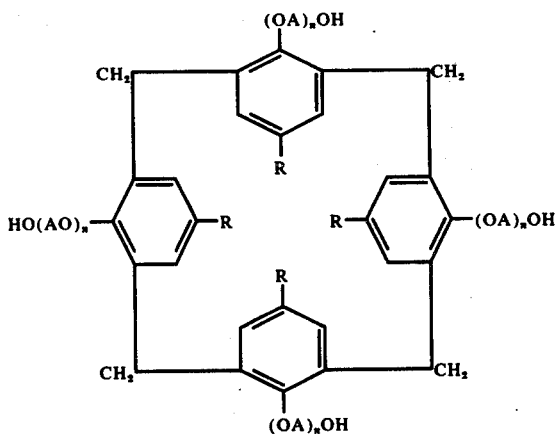

The alkylene oxides employed herein are 1,2-alkylene oxides of the formula

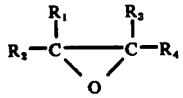

wherein $R_1$, $R_2$, $R_3$, and $R_4$ are selected from the group consisting of hydrogen, an aliphatic, cycloaliphatic, aryl, etc., group, for example ethylene oxide, propylene oxide, butylene oxide, amylene oxide, octylene oxide, styrene oxide, methylstyrene oxide, cyclohexene oxide (where $R_1$ and $R_3$ are joined to make a ring), etc., epichlorohydrin, glycide, etc.

Equivalents of alkylene oxides can also be employed, for example alkylene carbonates, i.e., ethylene carbonate, propylene carbonate, butylene carbonate, etc. In addition, alkylene oxides of the glycide, methyl glycide type can also be employed. Glycidyl ethers

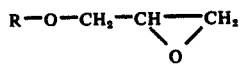

also can be used.

Since the products of this invention are preferably block polymers containing blocks or segments of alkylene oxide units which are added sequentially, the reaction is in essence a stepwise procedure. For the sake of simplicity of presentation, the invention will be illustrated by employing as a base oxyalkylatable cyclic resin $ZH_z$ and by employing only ethylene, propylene, and butylene oxides with the understanding that other hydrophobe oxides can be used in place of propylene and butylene oxides such as amylene oxide, octylene oxide, styrene oxide, etc. These are shown in the following table.

The products formed are represented by means of a stastical formula and are often referred to as cogeneric mixtures. This is for the reason that if one selects any oxyalkylatable material and subjects it to oxyalkylation, particularly where the amount of oxide added is comparatively large, for example 30 units of EtO, it is well known that one does not obtain a single constituent such as $RO(C_2H_4O)_{30}H$. Instead one obtains a cogeneric mixture of closely related homologous compounds in which the formula may be shown as the following:

where x as far as the statistical average goes, is 30, but the individual members present in significant amounts may vary from compounds where $x$ has a value of 25 and perhaps less to a point where $x$ may represent 35 or more (see Flory Chemical Reviews, vol. 30, No. 1, page 137). Thus, the formulae presented herein are statistical formulae.

TABLE IA

Step I

1.) $Z[(EtO)_nH]_z$
2.) $Z[(PrO)_nH]_z$
3.) $Z[(BuO)_nH]_z$
4.) $Z[(MO)_nH]_z$
5.) $Z[(PrO-BuO)_nH]_z$

Step IIA

Reaction of Step I product with one of the five oxides or mixtures employed in Step I, which oxide had not been reacted in the immediately preceding step. For example:

6.) $Z[(EtO)_n(PrO)_mH]_z$
7.) $Z[(EtO)_n(BuO)_mH]_z$
8.) $Z[(EtO)_n(MO)_mH]_z$
9.) $Z[(EtO)_n(PrO-BuO)_mH]_z$
10.) $Z[(PrO)_n(EtO)_mH]_z$
11.) $Z[(PrO)_n(BuO)_mH]_z$
12.) $Z[(PrO)_n(MO)_mH]_z$
13.) $Z[(PrO)_n(PrO-BuO)_mH]_z$
14.) $Z[(BuO)_n(EtO)_mH]_z$
15.) $Z[(BuO)_n(PrO)_mH]_z$
16.) $Z[(BuO)_n(MO)_mH]_z$
17.) $Z[(BuO)_n(PrO-BuO)_mH]_z$
18.) $Z](MO)_n(EtO)_mH]_z$
19.) $Z[(MO)_n(PrO)_mH]_z$
20.) $Z[(MO)_n(BuO)_mH]_z$
21.) $Z[(MO)_n(PrO-BuO)_mH]_z$
22.) $Z[(PrO-BuO)_n(EtO)_mH]_z$
23.) $Z[(PrO-BuO)_n(PrO)_mH]_z$
24.) $Z[(PrO-BuO)_n(BuO)_mH]_z$
25.) $Z[(PrO-BuO)_n(MO)_mH]_z$

Step IIIA

The products of Step IIA can be reacted with one of the five epoxides or mixtures of oxides which had not been reacted in the immediately preceding step, i.e., either EtO, PrO, BuO, MO, or PrO-BuO, with the above exclusion as to the epoxide just reacted. This will be illustrated as follows:

26.) $Z[(EtO)_n(PrO)_m(EtO)_xH]_z$
27.) $Z[(EtO)_n(PrO)_m(BuO)_xH]_z$
28.) $Z[(EtO)_n(PrO)_m(MO)_xH]_z$
29.) $Z[(EtO)_n(PrO)_m(PrO)-BuO)_xH]_z$
30.) $Z[(EtO)_n(BuO)_m(EtO)_xH]_z$
31.) $Z[(EtO)_n(BuO)_m(PRO)_xH]_z$
32.) $Z[(EtO)_n(BuO)_m(MO)_xH]_z$
33.) $Z[(EtO)_n(BuO)_m(PrO-BuO)_xH]_z$
34.) $Z[(EtO)_n(MO)_m(EtO)_xH]_z$

35.) $Z[(EtO)_n(MO)_m(PrO)_x H]_z$
36.) $Z[(EtO)_n(MO)_m(MuO)_x H]_z$
37.) $Z[(EtO)_n(MO)_m(PrO-BuO)_x H]_z$
38.) $Z[(EtO)_n(Pro-BuO)_m(EtO)_x H]_z$
39.) $Z[(EtO)_n(PrO-BuO)_m(Pro)_x H]_z$
40.) $Z[(EtO)_n(PrO-BuO)_m(BuO)_x H]_z$
41.) $Z[(EtO)_n(Pro-BuO)_m(MO)_x H]_z$
42.) $Z[(PrO)_n(EtO)_m(PrO)_x H]_z$
43.) $Z[(PrO)_n(EtO)_m(BuO)_x H]_z$
44.) $Z[(PrO)_n(EtO)_m(MO)_x H]_z$
45.) $Z[(PrO)_n(EtO)_m(Pro-BuO)_x H]_z$
46.) $Z[(PrO)_n(BuO)_m(EtO)_x H]_z$
47.) $Z[(PrO)_n(BuO)_m(PrO)_x H]_z$
48.) $Z[(PrO)_n(BuO)_m(MO)_x H]_z$
49.) $Z[(PrO)_n(BuO)_m(PrO-BuO)_x H]_z$
50.) $Z[(PrO)_n(MO)_m(EtO)_x H]_z$
51.) $Z[(PrO)_n(MO)_m(PrO)_x H]_z$
52.) $Z[(PrO)_n(MO)_m(BuO)_x H]_z$
53.) $Z[(PrO)_n(MO)_m(PrO-BuO)_x H]_z$
54.) $Z[(PrO)_n(PrO-BuO)_m(EtO)_x H]_z$
55.) $Z[(PrO)_n(PrO-BuO)_m(PrO)_x H]_z$
56.) $Z[(PrO)_n(PrO-BuO)_m(BuO)_x H]_z$
57.) $Z[(PrO)_n(PrO-BuO)_m(MO)_x H]_z$
58.) $Z[(BuO)_n(EtO)_m(PrO)_x H]_z$
59.) $Z[(BuO)_n(EtO)_m(BuO)_x H]_z$
60.) $Z[(BuO)_n(EtO)_m(MO)_x H]_z$
61.) $Z[(BuO)_n(EtO)_m(PrO-BuO)_x H]_z$
62.) $Z[(BuO)_n(PrO)_m(EtO)_x H]_z$
63.) $Z[(BuO)_n(PrO)_m(BuO)_x H]_z$
64.) $Z[(BuO)_n(PrO)_m(MO)_x H]_z$
65.) $Z[(BuO)_m(PrO)_m(PrO-BuO)_x H]_z$
66.) $Z[(BuO)_n(MO)_m(EtO)_x H]_z$
67.) $Z[(BuO)_n(MO)_m(PrO)_x H]_z$
68.) $Z[(BuO)_n(MO)_m(BuO)_x H]_z$
69.) $Z[(BuO)_n(MO)_m(PrO-BuO)_x H]_z$
70.) $Z[(BuO)_n(PrO-BuO)_m(EtO)_x H]_z$
71.) $Z[(BuO)_n(PrO-BuO)_m(PrO)_x H]_z$
72.) $Z[(BuO)_n(PrO-BuO)_m(BuO)_x H]_z$
73.) $Z[(BuO)_n(PrO-BuO)_m(MO)_x H]_z$
74.) $Z[(MO)_n(EtO)_m(PrO)_x H]_z$
75.) $Z[(MO)_n(EtO)_m(BuO)_x H]_z$
76.) $Z[(MO)_n(EtO)_m(MO)_x H]_z$
77.) $Z[(BuO)_n(EtO)_m(PrO-BuO)_x H]_z$
78.) $Z[(MO)_n(PrO)_m(EtO)_x H]_z$
79.) $Z[(MO)_n(PrO)_m(BuO)_x H]_z$
80.) $Z[(MO)_n(PrO)_m(MO)_x H]_z$
81.) $Z[(MO)_n(PrO)_m(Pro-BuO)_x H]_z$
82.) $Z[(MO)_n(BuO)_m(EtO)_x H]_z$
83.) $Z[(MO)_n(BuO)_m(PrO)_x H]_z$
84. $Z[(MO)_n(BuO)_m(MO)_x H]_z$
85. $Z[(MO)_n(BuO)_m(Pro-BuO)_x H]_z$
86. $Z[(MO)_n(PrO--BuO)_m(EtO)_x H]_z$
87. $Z[(MO)_n(Pro-BuO)_m(PrO)_x H]_z$
88. $Z[(MO)_n(PrO-BuO)_m(BuO)_x H]_z$
89. $Z[(MO)_n(PrO-BuO)_m(MO)_x H]_z$
90. $Z[(PrO-BuO)_n(EtO)_m(PrO)_x H]_z$
91. $Z[(PrO-BuO)_n(EtO)_m(BuO)_x H]_z$
92. $Z[(PrO-BuO)_n(EtO)_m(MO)_x H]_z$
93. $Z[(Pro-BuO)_n(EtO)_m(PrO-13 BuO)_x H]_z$
94. $Z[(PrO-BuO)_n(PrO)_m(EtO)_x H]_z$
95. $Z[(Pro-BuO)_n(PrO)_m(BuO)_x H]_z$
96. $Z[(Pro-BuO)_n(PrO)_m(MO)_x H]_z$
97. $Z[(Pro-BuO)_n(PrO)_m(PrO-BuO)_x H]_z$
98. $Z[(Pro-BuO)_n(BuO)_m(EtO)_x H]_z$
99. $Z[(PrO-BuO)_n(BuO)_m(PrO)_x H]_z$
100. $Z[(Pr0-BuO)_n(BuO)_m(MO)_x H]_z$
101. $Z[(PrO-BuO)_n(BuO)_m(PrO-BuO)_x H]_z$
102. $Z[(PrO-BuO)_n(MO)_m(EtO)_x H]_z$
103. $Z[(PrO-BuO)_n(MO)_m(PrO)_x H]_z$
104. $Z[(Pro-BuO)_n(MO)_m(BuO)_x H]_z$
105. $Z[(Pro-BuO)_n(MO)_m(PrO-BuO)_x H]_z$

Step IVA involves the oxyalkylation of the products of Step IIIA. Step VA involves the oxyalkylation of Step IVA. Further oxyalkylations involve Steps VIA–XA or higher. This process can be continued ad infinitum.

"MO" as employed herein refers to mixtures of ethylene oxide in conjunction with a hydrophobic alkylene oxide, i.e., an alkylene oxide having more than two carbon atoms. Thus, the hydrophobic alkylene oxides include propylene oxide, butylene oxide, amylene oxide, octylene oxide, styrene oxide, methyistyrene oxide, cyclohexene oxide, etc. However, in practice we prefer to employ ethylene oxide in conjunction with propylene and/or butylene oxide where the cyclic resin is the tetramer, z is 4.

In addition to the preparation of oxyalkylated cyclic resins, analogous thio and imino compound, i.e., thioalkylates and iminoalkylates, can be made.

Thus, the analogues of the above epoxides can be represented by the formula

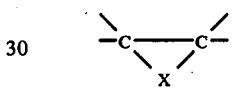

where X is oxygen, sulfur or NR where R is hydrogen or a substituted group, for example, alkyl, cycloalkyl, aryl, etc.

Analogous compounds can be prepared from these compounds as represented by

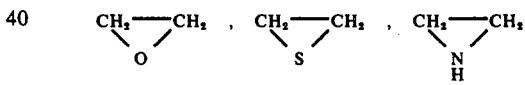

as well as homologues, i.e.,

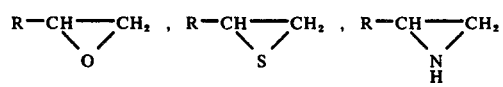

where R is for example alkyl, etc., i.e., methyl, ethyl, propyl, butyl, octyl, etc. The number of moles of these compositions added may correspond to those specified for oxyalkylated derivatives. In addition, corresponding homo, block, heteric compounds, etc., can all be prepared. Furthermore, alkylene oxides (AO), alkylene sulfides (AS), and alkylenimines (AI) can be present on the same resin, in any and all combinations, i.e., AO + AS, AO + AI, AO + AS + AI, AS + AI, etc.

Alkyleneimines employed in this invention include ethyleneimine,

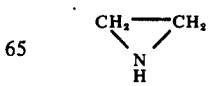

or substituted products thereof:

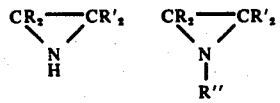

wherein R, R' and R'' are hydrogen or a substituted group, for example a hydrocarbon group such as alkyl, cycloalkyl, aryl, aralkyl, alkaryl, etc., but preferably hydrogen or alkyl.

Other illustrative examples include, for example,

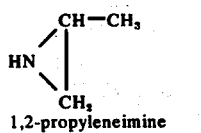
1,2-propyleneimine

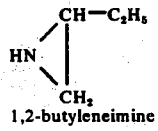
1,2-butyleneimine

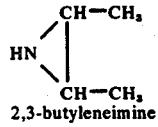
2,3-butyleneimine

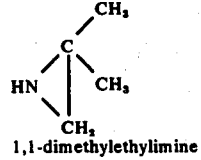
1,1-dimethylethylimine

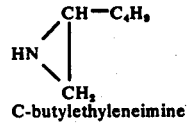
C-butylethyleneimine

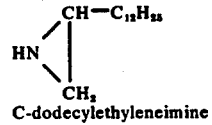
C-dodecylethyleneimine

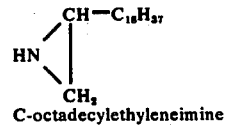
C-octadecylethyleneimine

A preferred class of polymerized 1,2 alkyleneimines include those derived from polymerizing

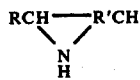

wherein R and R' are hydrogen or an alkyl radical, the latter being the same or different. Of the substituted ethyleneimines, propyleneimines are preferred.

These oxyalkylated tetramers employed in the treatment of oil field emulsions are used as such, or are preferably diluted with any suitable solvent, for example, aromatic solvents, such as benzene, toluene, xylene, tar acid oil, sulfur dioxide extract obtained in the refining of petroleum, cresol, anthracene oil, etc. Alcohols, particularly aliphatic alcohols, such as methyl alcohol, ethyl alcohol, denatured alcohol, propyl alcohol, butyl alcohol, hexyl alcohol, octylalcohol, etc., are often employed as diluents. Miscellaneous solvents, such as pine oil, acetone, carbon tetrachloride, etc., can also be employed as diluents. Similarly, the material or materials employed as the demulsifying agent of our process are often admixed with a mixture of the above solvents or other solvents customarily used in connection with the conventional demulsifying agents. The compositions of this invention may be used alone or in admixture with other suitable demulsifying agents.

The oxyalkylated cyclic phenol-aldehyde tetramers of this invention can be employed in solution, in suspension in such solvents as water, etc., in solid form such as in the form of sticks, pellets, chunks, etc., either alone or as a co-solvent solid such as in a solid solution in naphthalene and the like, etc. These sticks may be employed downhole. Since the compositions of this invention are frequently used in a ratio of 1 to 10,000, or 1 to 20,000, or 1 to 30,000, or even 1 to 40,000, or 1 to 100,000 as in desalting practice, an apparent insolubility in oil is not significant, because said compositions undoubtedly have some solubility within such concentrations.

In practicing our process for resolving petroleum emulsions of the water-in-oil type, a treating agent or demulsifying agent of the kind herein described is brought into contact with or caused to act upon the emulsion to be treated, in any of the various apparatus now generally used to resolve or break petroleum emulsions with chemical reagent, the above procedure being used alone or in combination with other demulsifying procedures, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from e.g. the bottom of the tank, and re-introduces it into the top of the tank, the demulsifier being added, for example, at the suction side of said circulating pump.

In a second type of treating procedure, the demulsifier is introduced into the well fluids at the wellhand or at some point between the wellhead and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, gas separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of this invention is placed at the well-head where the effluent liquids leave the well. This reservoir or container, which may vary from about a gallon to 50 gallons or more for convenience, is connected to a proportioning pump which injects the demulsifier drop-wise into the fluids leaving the wall. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:10,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:20,000, 1:50,000, or the like. However, with extremely difficult emulsions higher concentrations of demulsifier can be employed.

These oxyalkylated cyclic tetramers can be employed alone, in solution or in conjunction with other chemical demulsifiers. Tetramers of this invention often form synergistic mixtures when combined with demulsifiers commonly in use today.

In recent years pipe line standards for oil have been raised so that an effective demulsifier must not only be able to break oil field emulsions under conventional condition without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasial sludge, and has little if any oil in the water phase.

The following demulsification examples are presented for purposes of illustration and not of limitation. This invention is illustrated with oxyalkylated cyclic phenol-aldehyde tetramers.

EXAMPLES

The oxyalkylated tetramers are superior reagents for resolving water-in-oil emulsions. The method employed for evaluating these materials is the "Bottle Test" described in "Treating Oil Field Emulsions," second edition, issued by Petroleum Extension Service and the Texas Education Agency in cooperation with the American Petroleum Institute, 1955 (revised 1962), pages 39–44.

The effectiveness of the present demulsifiers is based on their ability to resolve oil field emulsion with a minimum amount of reagent to yield bright oil that is essentially free of water and unresolved emulsion and meets pipeline specification (normally less than 1% BS&W).

An emulsion was taken from the Brookhaven, field, Chevron Oil Company production, J. B. Airington lease, well No. 1, containing 22% water. The demulsifier was added as a 1% active solution to 100 ml of the warmed emulsion (180° F). It was shaken 150 shakes and then allowed to quietly settle for 3 hours. The resultant top oil was then analyzed for water. A 1% solution of the product 26C gave clean oil, containing 1.0% water when 1.0 cc of reagent was used, 0.3% water when 1.5 cc of reagent was used and 0.1% water when 2.0 cc of reagent was used. This is considerably better than commercially used product. For example, when commercial compound A, the product used to treat this particular oil in this field, was evaluated 1.0 cc of A gave oil containing 8% water, 1.5 cc of A gave oil containing 6% water, and 2.0 cc of A gave oil with 3.6% water. Our cyclic tetramer derivative was also compared with its linear analogue compound. This material gave oil containing 9% water when 2.5 cc of 1% solution was used. At lower concentrations grindouts were not even taken because the emulsion was no longer sufficiently broken.

Results on this oil are summarized in the following table.

TABLE C

| Compound of Example | Ml of 1% solution | % water in treated oil |
| --- | --- | --- |
| 26C | 2.0 | 0.1 |
|  | 1.5 | 0.3 |
|  | 1.0 | 1.0 |
| 26L | 2.5 | 9.0 |
| Commercial product | 2.0 | 3.6 |
|  | 1.5 | 6.0 |
|  | 1.0 | 8.0 |

This table shows that the product of this invention is far superior to the commercial material and also that its linear analogue is a poor demulsifier.

An emulsion was taken from the Brookhaven field, Chevron Oil Company production, well No. 34, containing 45% water. The demulsifier was added as a 1% active solution to 100 ml of the warmed emulsion (170° F). It was shaken 200 shakes and then allowed to quietly settle for 4 hours. The following table summarizes the test results.

TABLE D

| Compound of Example | Ml of 1% solution | % water in treated oil |
|---|---|---|
| 70C | 2.7 | 0.2 |
| 70L | 2.7 | 18.0 |
| 70C | 2.2 | 0.4 |
| 70L | 2.2 | 29.0 |
| Commercial field compound | 2.7 | 2.0 |
| | 2.2 | 12.0 |

Many similar results were obtained with other compounds of this invention in a variety of fields. Some more of these data are summarized in the following tables.

TABLE E

| Field: | Fruitvale (California) |
|---|---|
| Producer: | Gulf Oil Corporation |
| Well: | KCL % water: 50% |
| No. Shakes | 5 min 130/min |
| Temperature: | 180° |
| Settling time: | 4 hours |

| Compound of Example | Ml of 1% solution | % of water in treated oil | |
|---|---|---|---|
| | | BS | H$_2$O |
| 57C | .4 ml | .6 | .4 |
| 57L | .4 ml | 12.4 | 6.3 |
| 58C | .4 ml | .2 | .3 |
| 58L | .4 ml | 7.8 | 3.9 |
| Commercial Field Compound | .4 ml | .6 | 1.0 |
| | .8 ml | .5 | .5 |
| 57C | .2 ml | 1.2 | 10.0 |
| 57L | .2 ml | untreated | |
| 58C | .2 | 1.2 | .8 |
| 58L | .2 ml | 7.9 | 11.6 |
| Commercial Field Compound | .2 ml | 6.0 | 8.0 |
| | .5 ml | 0.4 | 1.1 |

TABLE F

| Field: | Weeks Island (Louisiana) |
|---|---|
| Producer: | Shell Oil Corporation |
| Well & Lease: | Mylers Salt No. 15 |
| No. Shakes | 100 % water: 50% |
| Temperature: | Ambient |
| Settling Time: | 1 hour |

| Compound of Example | Ml of 1% solution | % water in treated oil | |
|---|---|---|---|
| | | BS | H$_2$O |
| 53C | 0.35 | 0.8 | 0.8 |
| 54C | 0.35 | 0.8 | 0.5 |
| 57C | 0.35 | 0.7 | 0.2 |
| 62C | 0.35 | .3 | .1 |
| 63C | 0.35 | .4 | .2 |
| 64C | 0.35 | .7 | .3 |
| Commercial Field Compound | 0.35 | 4.2 | 1.8 |
| | 0.50 | .7 | .7 |
| | 0.70 | .3 | .5 |

TABLE G

| Field: | Tilly Brooks (Canada) |
|---|---|
| Producer: | Chevron Ltd. Oil Company |
| Well & Lease: | Bathium Well No. 2 |
| No. Shakes | 150 hot |
| Temperature | 140° F |
| Settling Time: | 1½ hours |

| Compound of Example | Ml of 1% solution | % water in treated oil | |
|---|---|---|---|
| | | BS | H$_2$O |
| 28C | 3 ml | — | 0.4 |
| 22C | 3 ml | — | — |
| 31C | 3 ml | trace | trace |
| 32C | 3 ml | — | — |
| Standard Field Compound | 3 ml | — | 0.9 |
| 28C | 0.6 ml | 2.4 | 4.0 |
| 22C | 0.6 ml | 1.2 | 1.2 |
| 31C | 0.6 ml | 0.2 | 0.8 |
| 32C | 0.6 ml | 0.4 | 0.8 |
| Standard Field Compound | 0.6 ml | 1.2 | 4.4 |

The linear analogues were so poor in this field that grind-outs were not taken at the above ratios, where they barely worked at all on this sample.

Heretofore, a wide variety of surface active compounds have been used for breaking crude-oil emulsions and the number of actual compounds and compositions disclosed for this purpose runs into the thousands. They range from simple soaps, sulfates, and sulfonates to complex products of uncertain structure defined by the methods of preparation. They include anionic, cationic, ampholytic, and non-ionic agents, and even mixtures of the different major classes of surface active agents. They range in properties from low molecular weight compounds to polymeric products. Among these materials are the relatively simple sulfated and sulfonated compounds such as the Teepols, polyalkyl-benzene-sulfonates, and the sulfonated simple terpenes. Petroleum sulfonates such as the mahogany and green sulfonates have also been used successfully both alone and in conjunction with simple nonionic detergents. Among the most versatile and successful emulsion breakers for crude petroleum are the organic amine salts of mahogany sulfonates and alkylaromaticsulfonates. Both the simple amines and the long-chain or complex amines of high surface activity have been used in this connection. The carboxylic acid soaps both alone and in conjunction with auxiliaries have been successful in resolving crude oil emulsions of certain types. Simple nonionic surfactants of the polyethenoxy type, as well as the polymeric ester types of nonionics have been employed as emulsion breakers. A relatively large number of cationic surfactants are effective crude petroleum emulsion breakers. Among these materials are the long-chain fatty imidazolines, the polymerized amino alcohols, amine derivatives of chlorinated paraffin, as well as more complex amine derivatives. Among the ampholytic surfactants, the aspartic esters are stated to be good demulsifying agents, and crude oil emulsions have also been broken by aminated petroleum sulfonates.

The diversity of surfactants employed as demulsifiers is illustrated by the following list of patents describing such demulsifiers which is presented for purposes of illustration and not limitation. U.S. Pat. Nos. 2,695,882; 2,695,885-6-7-8-9-90-91; 2,695,917; 2,695,883-4; 2,695,909; 2,671,762; 2,457,735; 2,492,473; 2,540,437; 2,646,404; 2,653,135; 2,653,137; 2,653,136; 2,543,223; 2,443,273; 2,427,326; 2,562,878; 3,667,081; 2,615,853; 2,422,177; 2,442,073-4-5-6-7; 2,646,405-6; 2,589,198-9; 2,589,200-1; 2,407,895; 2,424,175; 2,472,573-4; 2,435,810; 2,454,382; 2,943,071; 2,950,310; 2,950,313; 1,944,021, etc.

The oxyalkylated tetramers of this invention are effective when employed alone. They also act synergistically with other surfactants. Thus, when the tetramers of this invention are employed with various surfactants which are good demulsifiers, or in many instances are only average demulsifiers, the mixture unexpectedly yields an excellent demulsifier through synergism.

Preferred examples are the polyesters of the type described in U.S. Pat. No. 2,563,878, and the sulfates and sulfonates of the type described in U.S. Pat. No. 1,944,021.

As is quite evident, a wide variety of cyclic tetrameric substituted phenol-aldehyde condensates can be prepared according to the method as described in said Ser. No. 172.869. Each of these tetramers can be oxyalkylated by a limitless combination of various oxides in various proportions. It is, therefore, not only impossible to attempt a comprehensive catalogue of such compositions, but to attempt to describe the invention in its broadest aspects in terms of specific chemical structures would be too voluminous and unnecessary, since one skilled in the art could by following the description of the invention select still other useful oxyalkylated cyclic phenol-aldehyde tetramers. This invention lies in the oxyalkylation of cyclic tetramers to yield a novel class of demulsifiers and the individual tetramers and oxide levels are important only in the sense that the properties of the resultant product can affect the demulsifier activity. To precisely define each specific useful aldehyde and phenol suitable for the formation of cyclic tetramer in the light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific cyclic tetramers and appropriate oxide levels suitable for this invention by reacting them in the process as set forth herein. In analogy to the case of a machine, wherein the use of certain materials of construction or dimensions of parts would lead to no practical useful result, various materials will be rejected as inapplicable where others would be operative. We can obviously assume that no one will wish to react a useless cyclic tetramer or the wrong level of oxide nor will be misled because it is possible to misapply the teachings of the present disclosure to do so. Thus, any tetramer can be reacted to yield an oxyalkylated derivative that can perform the function stated herein, i.e., can be employed as demulsifiers.

The term "oxylkylated" relates to reaction products of alkyleneoxide; "thioalkylated" relates to reaction products of alkylene sulfides; "aminoalkylated" relates to the reaction products of alkylene imines.

FURTHER DERIVATIVES

The oxyalkylated cyclic resins of this invention can be further reacted with various reagents such as, for example:

1. Diepoxides such as

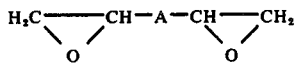

where A is a bridging group, for example, alkylene, phenylene,

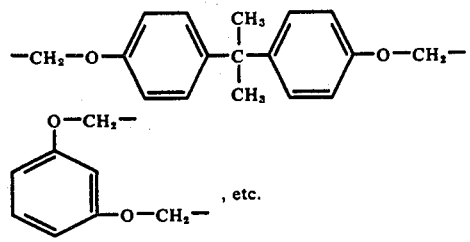

2. Fatty epoxides such as epoxides of high molecular weights, hydrocarbons, for example

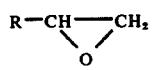

where R has at least six carbons, epoxides of oleic acids and esters, etc.

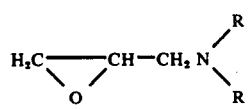

where the R's are alkyl, etc.

4. Carboxylic acids, mono-, di-, and poly-carboxylic acids, for example, acetic, propionic, stearic, oleic, etc., acids; maleic, diglycolic, phthalic, succinic, etc., or their derivatives such as anhyrides and/or halides, to give resins, full esters, fractional esters, etc.

5. Methylchloride, ethylchloride, etc., to yield ethers, i.e., —OR.

6. $R_3SiCl$ to yield the —$OSiR_3$ groups.

7. Sultones, for example, propane sultone, to yield the — O — trimethylene sulfonate derivatives.

These reaction products also have a wide variety of uses as demulsifiers, emulsifiers, surfactants, detergents, corrosion inhibitors, bactericides, etc.

We claim:

1. An oxyalkylated, thioalkylated or aminoalkylated infusible cyclic phenol-aldehyde resin having a melting point above 300° C. and the idealized formula

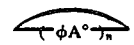

where n is 4 to 16, 100 is

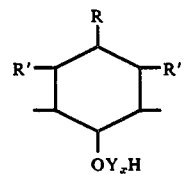

where A° is

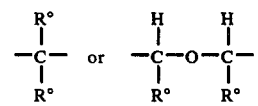

and the A°s are the same or different, R is alkyl, alkenyl, aryl, cycloalkyl, heterocyclic, alkaryl, aralkyl, halo, alkoxy or phenoxy and the Rs are the same or different, R' is hydrogen, alkyl, alkenyl, aryl, cycloalkyl, heterocyclic, alkaryl, aralkyl, halo, alkoxy or phenoxy and the R's are the same or different, Y is AO, AS, AI or combinations or mixtures thereof, x is 1 to about 2000, AO being alkylene oxide, arylene oxide, alkarylene oxide, cycloalkene oxide or combinations or mixtures thereof, AS being alkylene sulfide, AI being alkyleneimine, I being NR'' where R'' is hydrogen, alkyl, cycloalkyl, aryl, aralkyl or alkaryl, and R° is hydrogen, alkyl, aryl, cycloalkyl, alkaryl, aralkyl or heterocyclic and the R°s are the same or different.

2. The oxyalkylated, thioalkylated or aminoalkylated infusible cyclic phenol-aldehyde resin of claim 1 where n is 4.

3. The oxyalkylated infusible cyclic phenol-aldehyde resin of claim 1 where φ is

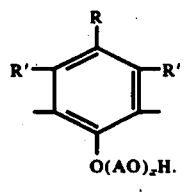

4. The oxyalkylated infusible cyclic phenol-aldehyde resin of claim 2 where φ is

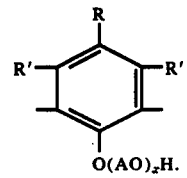

5. The oxyalkylated infusible cyclic phenol-aldehyde resin of claim 4 where R is alkyl, A° is

and R° is hydrogen.

6. The oxyalkylated infusible cyclic phenol-aldehyde resin of claim 5 wherein OA is ethylene oxide, propylene oxide, butylene oxide or combination or mixtures thereof.

* * * * *